UNITED STATES PATENT OFFICE.

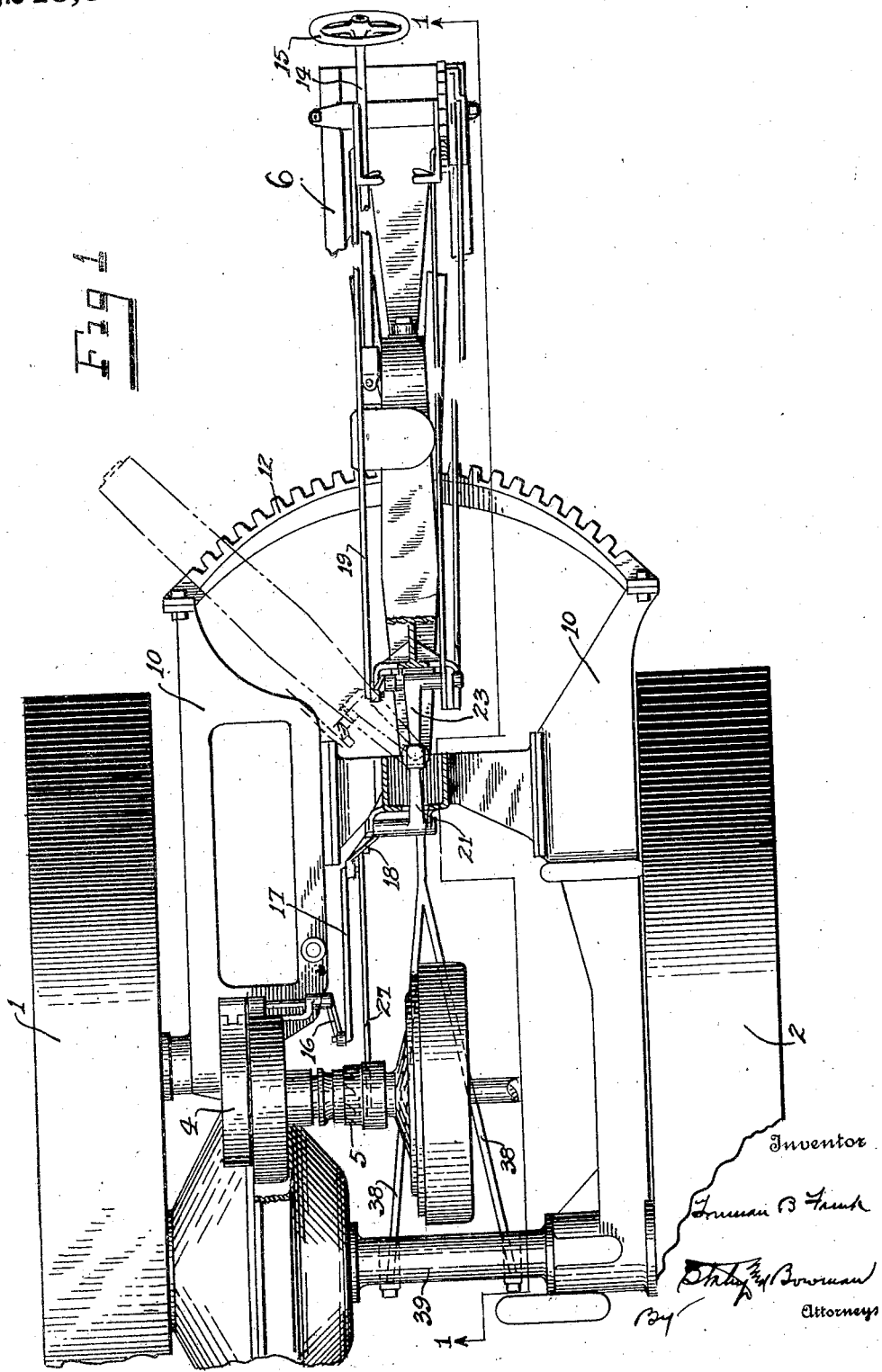

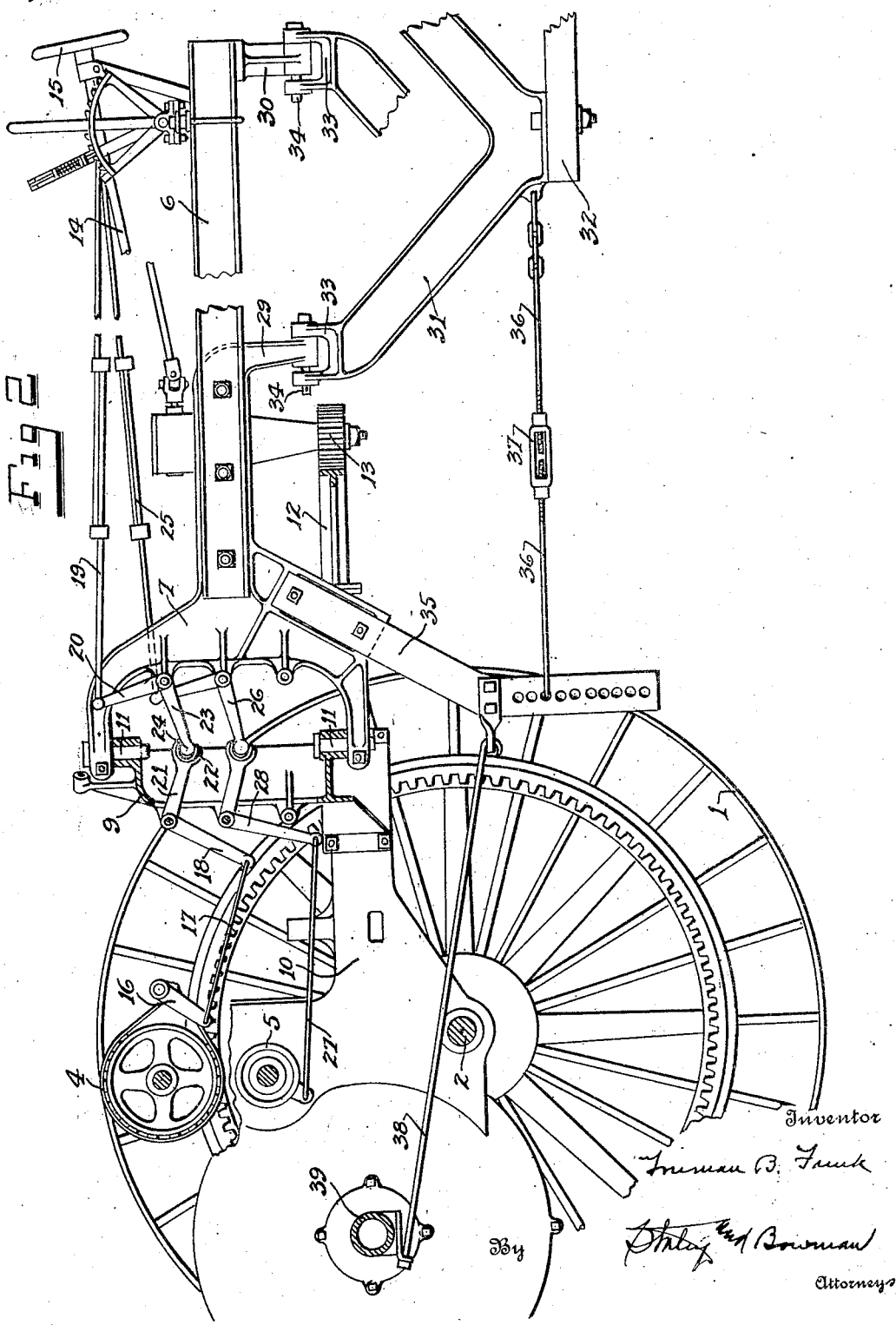

TRUMAN B. FUNK, OF COLUMBUS, OHIO, ASSIGNOR, BY MESNE ASSIGNMENTS, TO MOLINE PLOW COMPANY, OF MOLINE, ILLINOIS, A CORPORATION OF ILLINOIS.

TRACTOR.

1,243,598.

Specification of Letters Patent. Patented Oct. 16, 1917.

Application filed June 23, 1915. Serial No. 35,784.

*To all whom it may concern:*

Be it known that I, TRUMAN B. FUNK, a citizen of the United States, residing at Columbus, in the county of Franklin and State of Ohio, have invented certain new and useful Improvements in Tractors, of which the following is a specification.

This invention relates to improvements in tractors for agricultural implements and the like, particularly that type of tractor in which the power unit is supported by and swings with the forward driving and steering wheels in turning and is arranged to be swively connected with the implement to be drawn thereby.

One of the objects of the invention is to provide convenient and effective means for controlling the power unit from the driver's seat, or other convenient point on the implement connected therewith, in all the angular positions assumed by the power unit and implement relative to each other in the operation thereof.

A further object of the invention is to provide for attaching the implement to the power unit in such a way as to allow the parts to have a movement relative to each other to compensate for uneven travel.

A further object of the invention is to provide for attaching the implements in such a way as to partially counteract the downward reaction of the power unit upon the implement by placing the line of draft below the driving axle; thereby increasing the available tractive force of the machine, permitting greater ease in steering, and allowing for a better performance of the implement employed.

A further object of my invention is to simplify and make more effective the operation of devices of this character.

In the accompanying drawings:—

Figure 1 is a top plan view of a tractor embodying my improvements.

Fig. 2 is a section on the line 1—1 of Fig. 1.

The mechanism composing the power unit proper is constructed in much the same manner as that shown and described in my pending application Ser. No. 754,792 filed March 17th, 1913, and only those parts necessary to a proper understanding of the present improvements need be referred to.

1 and 2 represent the driving wheels, mounted upon the axle 2 and operatively connected with the power mechanism, so as to be driven thereby, all of the parts composing the power unit being supported by said axle and wheels in a way to swing therewith in changing direction. 4 represents a brake of any well known construction and 5 a clutch of any suitable form for throwing the motor into and out of driving relation with the transmission mechanism; this much of the controlling mechanism being shown in order to explain the improvements which I have made in the controlling devices.

In the present machine there is employed a beam 6, provided with a forward vertically arranged yoke 7 which is swively connected with a vertically arranged U-shaped standard 9 bolted to the frame 10 of the tractor by means of pivot pins 11 so that in turning the entire power unit including its controlling mechanism, turns about these pins. A toothed segment 12, bolted to the frame 10 of the tractor and in mesh with the pinion 13, supported from the beam 6 and capable of being rotated from suitable devices including a steering rod 14 and hand wheel 15, forms the means for turning the power unit relatively to the beam 6 and the implement connected therewith to effect the steering.

In order to operate the controlling devices from a convenient point within the reach of the operator, such as the driver's seat, which of course must be at a place a considerable distance beyond or behind the power unit, I have devised the following construction, referring more particularly to the brake and clutch control. The band of the brake 4 is connected by the crank 16 and link 17 to one of the arms 18 of a vertically arranged bell crank lever pivotally connected to the support 9 of the power unit. The brake rod 19 is connected to one arm 20 of a vertically-arranged bell crank lever pivotally connected to the yoke portion 7 of the beam 6. The other arm 21 of the bell crank on the power unit has its free end forked or yoked as indicated at 22, and the other arm 23 of the bell-crank lever on the beam has its free end formed with a ball 24 which fits in the yoke 22. It will be noticed that the yoke and ball connection is in direct vertical line with the pivots 11, so that while the connection is an effective one for operating the brake devices yet at the same time it allows the power unit to freely rotate about its pivotal point without in any way destroying the effective connection between the controlling devices.

The control for the other mechanism of the power unit is made in a similar manner, the devices for controlling the clutch only being shown, however. The clutch rod 25 is connected to a bell crank lever 26 and a link 27 connects the clutch 5 with the bell crank lever 28; the bell crank levers 26 and 28 being connected by a ball and yoke joint in the same manner as described in connection with the brake controlling devices.

By this construction it will be seen that the operator may be able to release the clutch, shift the gears, operate the brake and control the power regardless of the different angular positions assumed by the power unit relative to the implement attached thereto.

The implement to be drawn is hitched to the beam 6 in the following manner:—Extending downwardly from the beam 6 at a suitable distance apart are two lugs or projections 29 and 30, these lugs or projections being longitudinally perforated and standing in longitudinal alinement with each other. In the present case, I have shown a yoke 31 attached to and projecting upwardly from a tongue 32 of the implement to be attached to the tractor. The upper ends of the arms of this yoke are provided with bifurcated longitudinally perforated portions 33 which are pivotally connected with the lugs 29 by pins or bolts 34. Bolted to the beam 6 is a downwardly extending drag-bar 35, the lower end of which is provided with a series of perforations in which may be hooked the front end of a link or rod 36, the rear end of which is connected with the lower end of the yoke 31; a turn-buckle being preferably employed to secure the desired tension. The arm 35 is connected by a rod 38 to some suitable point at the forward end of the tractor such as the jack-shaft casing 39.

From this construction it will be seen that the beam 6 and yoke 31 may have a laterally swinging motion relative to each other by reason of the pivotal connection between the same and thus allow the parts to compensate for any uneven travel. It will also be seen that by reason of having the connection 38 secured to the drag-bar 35 below the axial line of the tractor, the downward reaction of the power unit upon the beam and implement is partly counteracted, thus increasing the tractive power and making the guidance of the machine more easy.

The yoke 31 is employed in connection with low-down machines, such as harrows, for instance. For high draft machines, such as cultivators, hay rakes, etc., the yoke 31 may be dispensed with and bifurcated portions, constructed like the portions 33, may be connected directly to the tongue of the machine. In such case the adjustable connection 36 is also dispensed with.

Having thus described my invention, I claim:—

1. In a machine of the character described, a wheeled power mechanism, a member pivotally connected to the rear portion of said power mechanism to permit lateral swinging movement of said mechanism and member relative to each other, and rod-like controlling devices for said power mechanism, part of which are located on said mechanism and part supported by said member, and flexible means for connecting the respective parts of said controlling devices in a manner to permit lateral swinging movement of the same relative to each other.

2. In a machine of the character described, a wheeled power mechanism, a member swivelly connected to the rear portion of said mechanism in a way to permit lateral movement, rod-like controlling devices for said mechanism located partly upon said mechanism and partly upon said member, and a laterally yieldable connection in said controlling devices in line with the swiveled connection between said mechanism and member.

3. In a machine of the character described, a wheeled power mechanism, a member swivelly connected with said power mechanism to permit lateral swinging motion, controlling devices for said power mechanism including a bell-crank lever pivotally connected to said power mechanism and a bell-crank lever pivotally connected to said member, and a laterally yieldable connection between the respective bell-crank levers located in line with the swiveled connection between said mechanism and member.

4. In a machine of the character described, a power mechanism, a member swivelly connected thereto to permit lateral motion of the parts relative to each other, controlling devices for said mechanism consisting in part of two bell-crank levers located respectively upon said mechanism and member, one of said bell-cranks having a yoke and the other a ball extending into said yoke, said yoke and ball being located in vertical alinement with the swiveled connection between the mechanism and member.

5. In a machine of the character described, the combination of a power mechanism, a beam provided at its forward end with a vertically standing yoke having arms standing in vertical alinement with one another, alined vertical pivots for swivelly connecting the arms of the yoke to the power mechanism, a controlling device carried by the beam, a bell crank lever pivoted to the yoke and having one of its arms connected with the controlling device, and means connected with the other arm of the bell crank lever at a point in substantial coincidence with the pivotal axis of the yoke and connected with operative portions of the power mechanism for controlling the same, substantially as described.

6. In a machine of the character described, the combination of a power mechanism, a beam provided at its forward end with a vertically standing yoke having arms standing in vertical alinement with one another, alined vertical pivots for swivelly connecting the arms of the yoke to the power mechanism, a controlling device carried by the beam, a bell crank lever pivoted to the yoke and having one of its arms connected with the controlling device, a second bell crank lever pivoted at its elbow to the power mechanism and having a jointed connection with the other arm of the first mentioned bell crank lever at a point in substantial coincidence with the axial center of movement of the yoke, and a connection between the second bell crank lever and operating portions of the power mechanism for controlling the same, substantially as described.

7. In a machine of the character described, the combination of a power mechanism, a beam provided at its forward end with a vertically standing yoke having arms in vertical alinement with one another, alined vertical pivots for connecting the yoke arms with the power mechanism, a controlling device carried by the beam, a bell crank lever pivoted to the power mechanism, a connection between one end of said bell crank lever and operating portions of the power mechanism, and a connection between the controlling device and said bell crank lever, connecting with the latter at a point in substantial coincidence with the center of pivotal movement of the yoke, substantially as described.

In testimony whereof, I have hereunto set my hand this 15th day of June, 1915.

TRUMAN B. FUNK.